L. C. IRVIN.
COMBINED PRUNER AND FRUIT PICKER.
APPLICATION FILED NOV. 11, 1914.
1,179,318.
Patented Apr. 11, 1916.
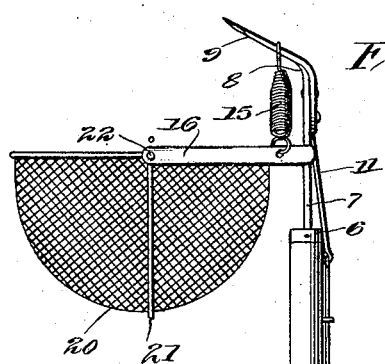
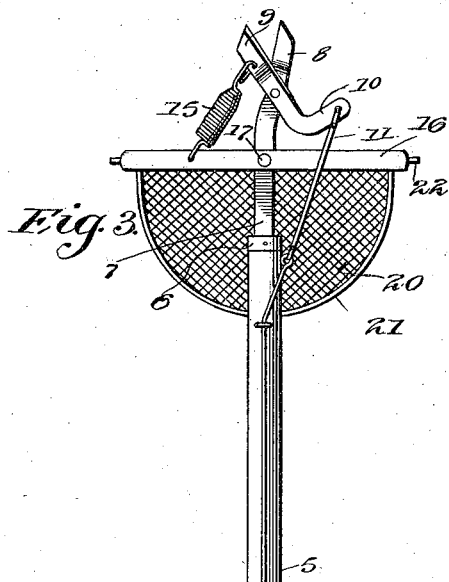
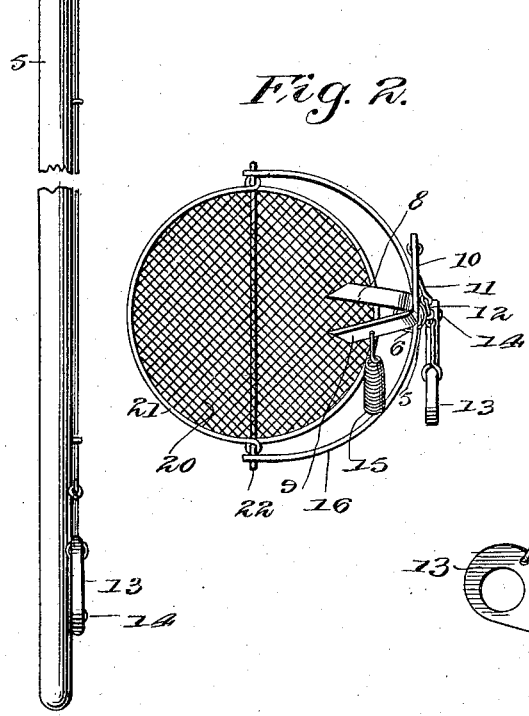
Inventor
Luther C. Irvin,
By Victor J. Evans
Attorney
Witnesses

UNITED STATES PATENT OFFICE.

LUTHER C. IRVIN, OF WARWICK, WEST VIRGINIA.

COMBINED PRUNER AND FRUIT-PICKER.

1,179,318.   Specification of Letters Patent.   Patented Apr. 11, 1916.

Application filed November 11, 1914. Serial No. 871,542.

*To all whom it may concern:*

Be it known that I, LUTHER C. IRVIN, a citizen of the United States, residing at Warwick, in the county of Pocahontas and State of West Virginia, have invented new and useful Improvements in Combined Pruners and Fruit-Pickers, of which the following is a specification.

The invention relates to a combined pruner and fruit picker, and has for its primary object to provide a device of this character wherein the branches of bushes, trees or the like can be conveniently cut, and also the device employed for the picking and gathering of fruit from trees.

Another object of the invention is the provision of a device of this character wherein the construction thereof is of novel form so that the pruner can be readily actuated for the pruning of bushes or trees, and the fruit picker at all times assumes a position to receive the fruit from the tree to avoid the dropping thereof upon the ground, which results in the bruising or the mashing of the fruit due to the fall thereof from the tree.

A further object of the invention is the provision of a device of this character which is extremely simple in construction, reliable and efficient in operation, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawings:—Figure 1 is a side view of a device constructed in accordance with the invention. Fig. 2 is a top plan view. Fig. 3 is a rear elevation.

Similar reference characters indicate corresponding parts throughout the several views in the drawing.

Referring to the drawing in detail, the device comprises a pole or staff 5, preferably made from wood, although it may be made from any other suitable rigid material having lightness in weight, and can be of any required length, one end of the said pole or staff being fitted with a ferrule 6 to prevent the splitting thereof, as in this end is engaged the shank 7 of the fixed shearing member of a pruner which includes the stationary blade 8 and the movable blade 9, which are pivoted together, the movable blade being formed with a substantially right angular extension 10 to which is loosely connected a pull link 11, the same being joined to a flexible pull wire 12 which is attached to an operating lever 13 pivoted at 14 on the pole or staff 5 near the opposite end thereof. The movable blade 9 has connected thereto a coiled retractile spring 15 which is adapted to exert a tension on the said blade to normally hold it in open relation to the stationary blade 8 of the pruner.

Fixed to the shank 7 is a substantially arcuate shaped fork forming a hanger 16, the same being centrally fixed by means of a rivet 17 to the said shank, and is disposed in a plane at right angles thereto to swingingly support a fruit receiver or basket 20, preferably made from wire fabric, secured to a frame 21, which is formed at diametrically opposite points with out-turned trunnions or pivots 22 which are engaged in the ends of the fork or hanger 16 to permit the free swinging of the basket or receiver 20, which is adapted to gravitate for assuming a perpendicular position irrespective of the angular position of the pole or staff 5 when the device is in use.

The spring 15 connected with the movable blade 9 is also connected to the fork or hanger 16, it being obvious that upon manipulating the lever 13 the pruner will be actuated so as to cut the limbs of a bush, tree or plant, and also this pruner can be used for clipping the fruit from a tree, which fruit when cut will fall into the basket or receiver 20 for the gathering thereof.

The blades 8 and 9 of the pruner are bent at an angle to the pole or staff 5 so as to protrude over the open mouth of the receiver or basket 20, thus in the clipping of the fruit the latter will be sure to fall within the receiver or basket.

What is claimed is:—

In combination with a pole having a pruner supported thereby provided with stationary and movable cutting blades, of a yoke substantially semi-circular in plan fixed at its center to the stationary blade to extend at right angles to the pole, a substantially semi-spherical basket having a circular frame at its mouth provided with diametrically opposed eyes bent therefrom, and a substantially semi-circular reinforcing bail encircling the basket centrally thereof in a vertical plane and having its ends passed through the eyes and turned outwardly to form pivots loosely engaging the ends of the yoke for swingingly connecting the basket thereto.

In testimony whereof I affix my signature in presence of two witnesses.

LUTHER C. IRVIN.

Witnesses:
E. H. IRVINE,
J. W. IRVINE, Sr.

Copies of this patent may be obtained for five cents each, by addressing the "Commissioner of Patents, Washington, D. C."